2,906,833

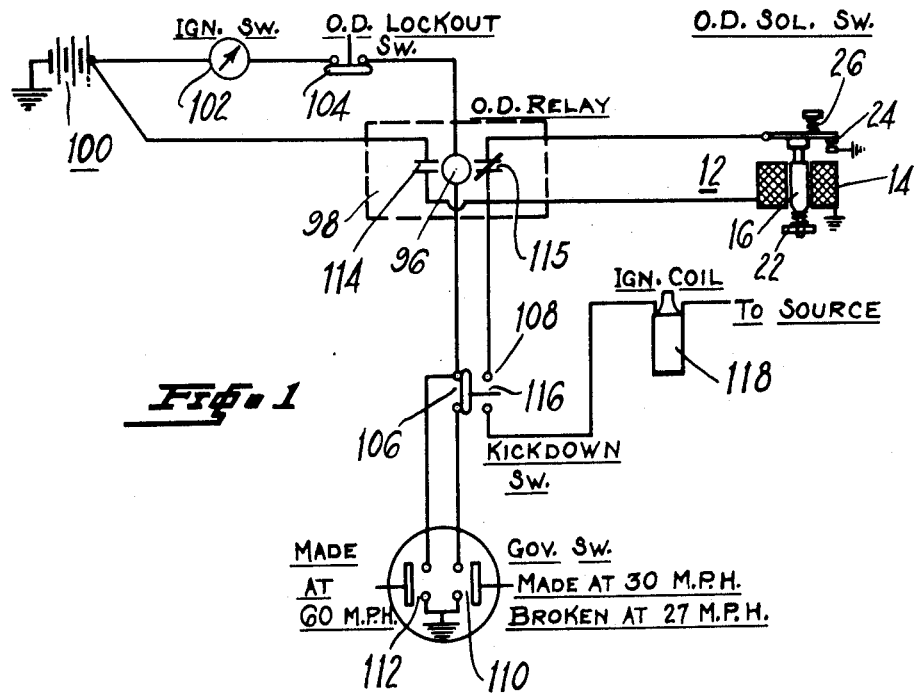
Fig. 1
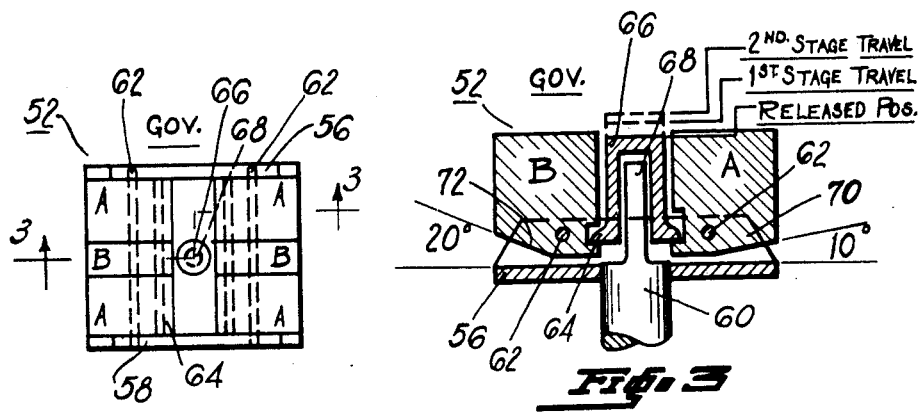
Fig. 2
Fig. 3
INVENTOR.
EDWIN E. PRATHER
RICHARD H. LONG
BY- H. Q. Clayton
ATTORNEY United States Patent Office 2,906,833
Patented Sept. 29, 1959

TWO STAGE GOVERNOR

Richard H. Long and Edwin E. Prather, South Bend, Ind., assignors to Bendix Aviation Corporation, South Bend, Ind., a corporation of Delaware Application December 9, 1957, Serial No. 701,523

2 Claims. (Cl. 200—80)

This invention relates in general to governors and more particularly to a stage type of centrifugal governor which may be used as one of the controls in an automotive vehicle.

With the overdrive transmission of the day it is desirable to effect the operation of this mechanism at a relatively low vehicle speed, say 30 m.p.h. It is also desirable, as is disclosed in our patent U.S. Patent Office application S.N. 567,302 filed February 23, 1956, to temporarily cut said mechanism out of operation when the vehicle is traveling at a relatively high speed, say 60 m.p.h. or above; for with the vehicle traveling at such a high speed the internal combustion engine thereof is punished severely if a so-called kickdown, that is down shift, operation of the overdrive is effected at these high vehicle speeds. With such an operation it would be necessary to speed up the engine to a point where the moving parts might be damaged.

It is accordingly an object of our invention to provide a centrifugal type governor switch mechanism which may be included in a mechanism for operating an overdrive mechanism, said governor being operable in two stages, first to cut the overdrive into operation at a relatively low vehicle speed and then to cut said overdrive out of operation at a relatively high vehicle speed.

A further object of our invention is to provide a simple, compact, and easily serviced switch operating two-stage centrifugal governor mechanism.

Other objects of the invention and desirable details of construction of parts will become apparent from the following detailed description of an illustrative embodiment of the invention, taken in conjunction with the accompanying drawings illustrating said embodiment, in which:

Figure 1 is an electrical schematic view disclosing the governor of our invention incorporated in a mechanism for controlling the overdrive transmission mechanism of an automobile vehicle;

Figure 2 is a top plan view of the two-stage governor of our invention; and

Figure 3 is a sectional view, taken on the line 3—3 of Figure 2, disclosing the details of the governor of our invention.

There is schematically disclosed in Figure 1 a mechanism for operating an overdrive transmission mechanism of an automatic vehicle said operating mechanism including a solenoid 12 the armature 16 of which moves down, when the solenoid is energized and with a release of the accelerator of the vehicle, to operate the overdrive, not shown, to place the same in its overdrive setting. Then when the solenoid is deenergized the armature, after the driving torque of the internal combustion engine of the vehicle is appreciably reduced, moves upwardly to cut the overdrive out of operation.

The solenoid 12, having a coil 14, is controlled by a relay 98 having a coil 96 which controls a normally open switch 114 and a normally closed switch 115. As is disclosed in Figure 1 the coil is wired in series with a grounded battery 100, the ignition switch 102 of the vehicle, an overdrive lockout switch 104, a switch 116 of an accelerator operated two-part kickdown switch mechanism 108, and two grounded switches 110 and 112 of the governor constituting our invention. A grounded overdrive switch 24, opened by a spring 22 when the solenoid 12 is deenergized and closed by a weaker spring 26 when said solenoid is energized, is wired to the relay switch 115, an accelerator operated kickdown switch 116, and the ignition coil 118 of the ignition system of the vehicle.

No claim is made to the above described mechanism for operating the overdrive inasmuch as the same is claimed in our aforementioned application S.N. 567,302 the instant application being a division thereof. The operation of said mechanism is described below incidental to the description of the governor constituting our invention.

Describing now this two-stage governor and the switch mechanism 110, 112 operated thereby the mounting for the same includes a plate 56 disclosed in Figures 2 and 3. Pin supporting end plates 58 are secured to the plate 56 and together with said plate form a centrifugal weight supporting channel member. As is disclosed in Figure 3, the plate 56 is fixedly mounted on a drive shaft 60 which may be connected to the propeller shaft of the vehicle or any other moving part thereof the speed of which is directly proportional to the speed of the vehicle. Prism shaped centrifugal weights A, four in number, are pivotally mounted within the channel member 56, 58 on pins 62 which are mounted, at their ends, in the end plates 58; and as is disclosed in Figure 2, prism shaped centrifugal weights B, two in number, are pivotally mounted on the pins 62 and are positioned between the weights A. All of the weights are notched to receive a rectangular shaped plate 64 positioned within the channel member, said plate having fixedly secured thereto a cylindrically shaped switch operating pin 66. This pin is hollowed out to receive a guide pin 68 mounted on the end of the drive shaft 60. The four weights A are provided with a bevel portion 70 outlining, with the plate 56, an angle of say 10°; and the two weights B are beveled at 72 to outline, with the plate 56, an angle of say 20°.

Describing the operation of the governor mechanism 52, when the vehicle is traveling at say 30 m.p.h. the six centrifugal weights A and B operate in unison to move the plate 64 and its pin 66 upwardly to their "first-stage travel" a position which is indicated in dotted lines in Figure 3; and by this operation the pin 66 serves to actuate the switch 110, Figure 1, to close the same. When the vehicle reaches a speed of say 60 m.p.h. the two weights B are operative in unison to move the pin 66 to its "second-stage travel" position disclosed in dotted lines in Figure 3; and by this operation the pin 66 serves to actuate the switch 112 to close the same. As will be observed from an inspection of Figure 3, the beveled portion 70 of the weights A move into contact with the plate 56 when the speed is 30 m.p.h.; accordingly, above this speed there is no further pin operating movement of the weights A. It is to be noted that the notch in the weights A is deeper than the notch in the weights B this being necessary to permit the continued movement of the pin 66 when the vehicle speed is increased above 30 m.p.h. The switches 110 and 112 are not disclosed in Figure 3 inasmuch as any suitable connection may be provided between the pin 66 and said switches.

Describing the operation of the mechanism of Figure 1 the driver of the vehicle may effect an overdrive setting of the transmisison by speeding up the vehicle to 30 m.p.h. to close the switch 110, and then releasing the accelerator of the vehicle to reverse the engine torque. With this operation the relay coil 96 is energized it being noted that a switch 106 of the kickdown switch mechanism, wired in series with the battery, coil, and switches 102, 104 and 110, is closed when the acceleator is released. The energization of the coil results in a closing of the switch 114 with a resultant energization of the solenoid 12; and the latter operation results in a movement of the armature 16 downwardly, Figure 1, to place the transmission in its overdrive setting. Should the driver of the vehicle then elect to down shift the transmission when the vehicle is travelling under 60 m.p.h., say to facilitate the climbing of a steep hill, he will depress the accelerator sufficiently to open the switch 106 and close the switch 116; and a study of the electrical circuitry of Figure 1 will reveal that this operation will deenergize the solenoid 12 and momentarily ground the ignition coil the switch 24 remaining closed by the operation of the switch 26 until the reversal of torque makes it possible for the switch 24 to be opened.

It is, as stated above, undesirable to lower the gear ratio setting of the transmission, that is effect a kickdown operation thereof, when the vehicle is traveling at or above 60 m.p.h.; for to do so would, with the mechanism of our inveniton, unduly increase the speed of the engine. Accordingly the safety switch 112 is incorporated in the mechanism of our invention to make such a down shift impossible; and the two stage governor of our invention provides a control which cooperates with the switch 112 to this end.

There is thus provided, by the two-stage governor of our invention, a device with a switch to control the overdrive transmission control mechanism of Figure 1 of the drawings; and this governor is also well suited to be incorporated in any speed responsive mechanism operable, at two different speeds of a driving member, to initiate two different operations of the mechanism.

We claim:

1. A two-stage governor mechanism adapted to actuate two electric switches, said mechanism including a driven channel shaped support member having a rectangular shaped base portion and upwardly extending end members, a plurality of prism shaped centrifugally operated weight members pivotally mounted on pins mounted in said end members, certain of said weight members being shaped to angularly move a certain amount with an operation thereof and certain of said weight members being shaped to angularly move another certain amount with an operation thereof, a weight member actuated rectangular plate positioned between the weight members and having portions thereof nesting within portions of said weight members, and a switch actuating thrust member secured to the plate at its central portion, said thrust member being positioned between certain of the weight members whereby with an operation of the weight members said thrust member is bodily moved upwardly to, in two stages, actuate the switches to be operated.

2. A two-stage governor mechanism adapted to operate a plurality of switches, said mechanism including a channel member, a plurality of pin members mounted within the channel member, a drive shaft connected to said channel member, a plurality of centrifugally operated weight members pivotally mounted on said pin members each of said weight members being notched in their base portion and each of said members being beveled at their base to provide a portion contactible with a portion of the channel member, a weight member actuated rectangular plate positioned between the weight members and having portions thereof nesting within the notched portions of said weight members, and a switch operating thrust member slidably mounted on the end of the driving member to which the channel member is fitted.

References Cited in the file of this patent

UNITED STATES PATENTS

| | | |
|---|---|---|
| 2,646,978 | Barnes | July 28, 1953 |
| 2,669,983 | Reddy et al. | Feb. 23, 1954 |